(12) United States Patent
Voogt

(10) Patent No.: US 10,294,167 B2
(45) Date of Patent: May 21, 2019

(54) RECOVERY OF PHOSPHOROUS

(71) Applicant: CDEM B.V., Arnhem (NL)

(72) Inventor: Nicolaas Voogt, Arnhem (NL)

(73) Assignee: CDEM B.V., Arnhem (NL)

(*) Notice: Subject to any disclaimer, the term of this patent is extended or adjusted under 35 U.S.C. 154(b) by 174 days.

(21) Appl. No.: 15/414,116

(22) Filed: Jan. 24, 2017

(65) Prior Publication Data

US 2017/0129819 A1 May 11, 2017

Related U.S. Application Data

(63) Continuation of application No. PCT/NL2015/050519, filed on Jul. 15, 2015.

(30) Foreign Application Priority Data

Jul. 24, 2014 (NL) ...................................... 2013253

(51) Int. Cl.

| | | |
|---|---|---|
| *C05B 17/00* | (2006.01) | |
| *C02F 1/28* | (2006.01) | |
| *C02F 1/52* | (2006.01) | |
| *C02F 1/66* | (2006.01) | |
| *C02F 3/28* | (2006.01) | |
| *C05B 15/00* | (2006.01) | |
| *C05F 11/00* | (2006.01) | |
| *C02F 1/00* | (2006.01) | |

(Continued)

(52) U.S. Cl.
CPC .............. *C05B 17/00* (2013.01); *C02F 1/001* (2013.01); *C02F 1/281* (2013.01); *C02F 1/385* (2013.01); *C02F 1/5245* (2013.01); *C02F 1/66* (2013.01); *C02F 3/28* (2013.01); *C05B 15/00* (2013.01); *C05F 11/00* (2013.01); *C02F 1/42* (2013.01); *C02F 5/06* (2013.01); *C02F 11/127* (2013.01); *C02F 2001/007* (2013.01); *C02F 2101/105* (2013.01); *C02F 2103/20* (2013.01)

(58) Field of Classification Search
CPC ......... C05B 17/00; C05B 15/00; C02F 1/001; C02F 1/385; C02F 11/00; C02F 1/5245; C02F 1/66; C02F 1/281; C02F 3/28; C02F 2103/20; C02F 1/42; C02F 2101/105; C02F 2001/007; C02F 11/127; C02F 5/06

See application file for complete search history.

(56) References Cited

U.S. PATENT DOCUMENTS

2013/0299420 A1   11/2013  Barak

FOREIGN PATENT DOCUMENTS

| CN | 101234839 | 8/2008 |
|---|---|---|
| CN | 103626276 | 3/2014 |

(Continued)

OTHER PUBLICATIONS

Chen, et al., "Adsorption of Phosphate on Alumina and Kaolinite from Dilute Aqueous Solutions", Journal of Colloid and Interface Science, vol. 43, No. 2, 1973, 421-439.

(Continued)

*Primary Examiner* — Jennifer A Smith
(74) *Attorney, Agent, or Firm* — Peacock Law P.C.; Janeen Vilven

(57) ABSTRACT

A method for recovery of phosphorous, in particular of phosphorous from a waste stream, and a product obtained thereby. The product is in a form wherein phosphorous can be released to, e.g., the soil and plants at a desired amount per interval of time.

14 Claims, 1 Drawing Sheet

(51) Int. Cl.
    *C02F 1/38*     (2006.01)
    *C02F 1/42*     (2006.01)
    *C02F 5/06*     (2006.01)
    *C02F 11/127*     (2019.01)
    *C02F 101/10*     (2006.01)
    *C02F 103/20*     (2006.01)

(56) References Cited

FOREIGN PATENT DOCUMENTS

| | | | | |
|---|---|---|---|---|
| EP | 1119408 A1 | * | 8/2001 | ............ B01D 53/02 |
| EP | 2511243 | | 10/2012 | |
| JP | 53-082052 | | 7/1978 | |
| JP | 2009285636 | | 12/2009 | |
| KR | 101169563 B1 | * | 7/2012 | ............ B01D 53/02 |
| NL | 2002282 | | 6/2010 | |
| WO | 2016/013929 | | 1/2016 | |

OTHER PUBLICATIONS

Kamiyango, et al., "Phosphate removal from aqueous solutions using kaolinite obtained from Linthipe, Malawi", Physics and Chemistry of the Earth, vol. 34, No. 13-16, 2009, 850-856.

Perassi, et al., "Adsorption and surface precipitation of phosphate onto CaCO3—montmorillonite: effect of pH, ionic strength and competition with humic acid", Geoderma, vol. 232, 20214, 600-608.

Robo, "Role of Lattice Hydroxyls of Kaolinite in Phosphate Fixation and Their Replacement by Fluoride", Journal of Colloid Science, vol. 9, No. 5, 1954, 385-392.

Ute, et al., "Calcium Silicate Hydrate Triggered Phosphorus Recovery—An Efficient Way to Tap the Potential of Waste- and Process Waters as Key Resource", https://www.environmental-expert.com/articles/calcium-silicate-hydrate-triggered-phosphorus-recovery-an-efficient-way-to-tap-the-potential-of-wast-8896/full-article, 2006, 1747-1765.

* cited by examiner

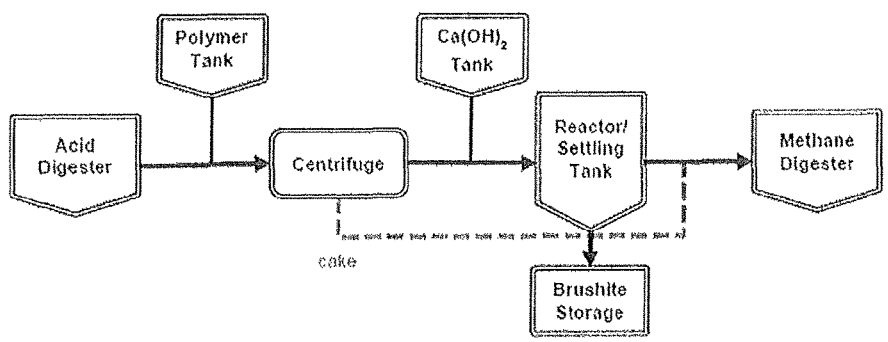

RECOVERY OF PHOSPHOROUS

CROSS-REFERENCE TO RELATED APPLICATIONS

This application is a continuation of International Patent Application PCT/NL2015/05019, filed Jul. 15, 2015, in the name of "CDEM B.V.", which PCT-application claims priority to Netherlands Patent Application with Serial No. 2013253, filed Jul. 24, 2014, in the name of "CDEM B.V.", and the specifications and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The present invention is in the field of an improved method for recovery of phosphorous, in particular of phosphorous from a waste stream, and to a product obtained thereby. The product is in a form wherein phosphorous can be released to, e.g., the soil and plants at a desired amount per interval of time.

Background of the Invention

Phosphorous is an element (P) that is used abundantly especially for growing crops, such as by adding fertilizer. To stress the significance of phosphorous it is noted that P fertilizer is essential for modern food production and is the limiting factor in crop yields. P is a critical global resource, as are water and energy resources. Phosphorus is considered essential for all living matter, including bacteria, plants and animals.

Phosphate rock, used as a source for P in fertilizers, clearly is a non-renewable resource that are likely to be depleted in 50-100 years, so there is a need to reuse phosphorus. Production peak is expected in about twenty years' time. Unlike other natural resources phosphorus has no substitute in food production. In view of a growing food demand such is even more of a concern. It is also noted that mining (of phosphate) is an energy intensive and polluting activity. Such will become even worse as the quality of phosphate rock is declining ($[P_2O_5]$ in mined rock is decreasing and the concentration of associated heavy metals is increasing). It is noted that in principle heave metals need to removed, if applied as fertilizer, which is at the least energy intensive. One may conclude based on the above that cheap fertilizer is an element of the past. Alternative strategies need to be developed, as is the case.

For instance it is noted that human and animal excreta (urine and feces) are renewable and readily available sources of phosphorus. On top of that urine is essentially sterile and contains plant-available nutrients (P,N,K) in a correct ratio. Treatment and reuse is in principle simple but in practice still somewhat cumbersome, energy intensive and therefore expensive. For instance, removing high amounts of phosphorus at an end of a flow, such as at a wastewater treatment plant is expensive and energy intensive. It would be better if phosphorous would be captured at the source, e.g., a toilet, also in view of heavy metals.

In an extensive review paper Sartorius et al., in "Phosphorus Recovery from Wastewater—State-of-the-Art and Future Potential", Int. Conference Nutrient recovery and management 2011, Inside and outside the fence, Jan. 9-12, 2011, Miami, Fla., USA, describe various routes for recovery of phosphorus. The mention that "very different approaches to the recovery of phosphorus from wastewater, sludge and ashes exist. These approaches differ by the origin of the used matter (wastewater, sludge liquor, fermented or non-fermented sludge ash) and the process precipitation, wet chemical extraction, and thermal treatment). They are characterized by their process steps, use of chemicals, complexity and effectiveness of the technology, economics, product quality for further use (fertilizer or industrial use), residuals, maturity of the technology, and degree of centralization and are rated positive, negative or neutral. Together these characteristics form the advantages and disadvantages of all the recovery processes". So far none of these routes seem to be implemented fully.

US2013/0299420 A1 recites a method for recovering phosphate from sewage treatment plants using multi-stage anaerobic digestion includes the treatment of organic acid digest with calcium hydroxide, calcium oxide, and similar compounds to raise pH to near neutral values and precipitate calcium phosphate compounds such as brushite and similar amorphous compounds. The method includes the formation of calcium phosphates on weak-acid ion exchange columns and membranes in contact with organic acid digest. The system includes removal of the calcium phosphate compounds formed by sedimentation, either static or against an upwelling flow, centrifugation, or filtration. Under ideal conditions and surplus of calcium 50-90% (15/17 or ~88%) of the phosphate may be captured, i.e., 10-40% remains in the sewage; these conditions are typically not reached, so incomplete capturing of phosphate occurs.

Various documents relate to capturing phosphorous. The two following documents relate to the so-called P-RoC process (Phosphorus Recovery by Crystallization from waste and process water) (as developed by the Karlsruher Institut für Technologie). According to the authors this process is capable of recovering about 50-60% of the P being present (Ehbrecht et al., 2nd European Sustainable Phosphorus Conference (ESPC2) Berlin, 5-6 Mar. 2015).

For instance EP 2 511 243 A1 recites a plant for phosphate removal from wastewater in a continuous operation, comprising a substantially cylindrical stirred reactor, which is charged with calcium silicate hydrate (CSH) as a crystallization substrate and a sedimentation container, where the stirred reactor is divided into a resting zone, which is located in the upper part and a reaction zone which is located in the lower part. In a reaction with phosphate comprising waste water three phosphate minerals are claimed to be formed, namely hydroxyl apatite, struvite ($NH_4MgPO_4.6H_2O$), and brushite. The "P-elimination" in FIG. 2 shows a % between about 35% and 90% (or 65%-10% loss), for some reason depending on a reactor volume; such seems to reflect that the process is not scalable. FIG. 3 provides even worse results as a function of reaction time.

Ute Berg et al. in "Calcium silicate hydrate triggered phosphorous recovery—an efficient way to tap the potential of waste- and process waters as a key resource", Internet citation, Jan. 1, 2006, pages 1747-1765 describes the use of a CSH for forming amongst others brushite. P-elimination of 30% to about 95% are reached in a laboratory fixed bed experiment, hence under ideal conditions. A fixed bed reactor is considered unsuited for a continuous process; even further after about 50 bed volumes the P-elimination drops dramatically. When waste water is used a maximum of about 90% is reached and a similar drop is observed. Mainly hydroxyl apatite was formed and some brushite.

The CSH materials are the main product of the hydration of Portland cement and are characterized by a typically complex structure and ratio between components, wherein a relative amount of Ca and Si are given and the oxygens are attributed to Ca and Si (or complexes thereof). Therein no individual Cao, $SiO_2$ or hydrate can be distinguished; Ca, Si, H and O are part of a large complex, comparable to a crystal.

CSH materials may be used for pozzolanic reactions. The pozzolanic reaction is a chemical reaction that occurs in portland cement containing pozzolans. The pozzolanic reaction relates to a simple acid-base reaction between calcium hydroxide, also known as Portlandite, or $(Ca(OH)_2)$, and silicic acid ($H4SiO_4$, or $Si(OH)_4$); it is not performed in an aqueous environment. This has nothing to do with the present invention, but relates to a different field of technology, namely cement formation.

There is a need for improved methods for capturing phosphate from aqueous solutions; however, the prior art methods suffer from various drawbacks, such as sensitivity to impurities, such as heavy metals, organic material, etc., relatively high amounts of non-captured phosphorous, relative high costs per unit phosphorous captured, such as due to relative high amounts of reactants needed to capture relative low amounts of phosphorous, and energy, at the best a process that is optimized for a given phosphorous concentration range, capturing phosphorous in a form (typically and mostly struvite) that cannot be distributed easily through the soil, and non-robust processes.

Hence there still is a need for relative simple and effective process for recovering phosphorous, which reduces losses, and which overcomes one or more of the above mentioned disadvantages without jeopardizing beneficial characteristics.

BRIEF SUMMARY OF THE INVENTION

The present invention relates to an improved method for recovering phosphorous from an aqueous solution. The present method reduces losses from about 10-40% of prior art methods to less than 1%. The present method has been found to be insensitive to impurities, such as heavy metals and organic material. The present method makes use of cheap reactants, such as CaO, clay and $CaCO_3$, in low amounts, which reactants are present as a mixture of ingredients; such is clearly different in chemical and physical aspects from a composition having a similar amount and/or ratio of chemical elements (e.g., Ca, C, O, Al, Si) being present, as the person skilled in the art will appreciate.

Clay minerals are hydrous aluminium phyllosilicates, sometimes with variable amounts of iron, magnesium, alkali metals, alkaline earths, and other cations; clays are considered to comprise $SiO_4$ units and $AlO_4$ units. A CSH is not a clay nor does it resemble a clay. The present method has been found to be robust, e.g., it can handle almost any aqueous solution, such as waste streams. Advantageously the present method provides phosphate largely (>90%) in the form of brushite (instead of prior art struvite); brushite is a phosphate mineral that can be used in agriculture directly, due to its favorable uptake characteristics, and can be reprocessed into high-grade phosphorous ore. The present method can be performed at ambient temperature and pressure; hence besides reactants no reaction costs are involved. Surprisingly the efficiency of the present process is higher than could "theoretically" be expected. The present method can be operated in a continuous or semi continuous mode, making it possible to process continuous flows without problem at a relatively constant output. The process is also scalable, hence small and large volumes can be processed.

The mineral brushite relates to a phosphate mineral having as general formula $CaHPO_4.2H_2O$. Crystals thereof are monoclinic prismatic, with space group: I2/a. The unit cell of crystals has axis a=6.265 Å, b=15.19 Å, c=5.814 Å; and β=116.47°. It contains 4 elements per unit cell (Z=4).

The present composition comprises 5-40% CaO (w/w, also weight percentages are taken relative to a total weight of the composition, unless stated otherwise), 10-40% clay mineral, and 20-60% $CaCO_3$. In an example about 0.5-20 gr of the composition was added relative to 1 gr of soluble phosphate, such as 1-10 gr composition. Typically the amount of composition is calculated based on an amount of CaO: 0.5-2 mole CaO/mole soluble P is added, which is close to 1 mole CaO per mole soluble P. Such depends a bit on the characteristics of the aqueous solution. It comes as a surprise that under relatively harsh conditions relatively small amounts of the present composition suffice for recovering the phosphorous.

In an example the phosphorous settles easily and can then be recovered.

The present invention provides a solution to one or more of the above mentioned problems and overcomes drawbacks of the prior art.

Advantages of the present description are detailed throughout the description.

DETAILED DESCRIPTION OF THE INVENTION

In a first aspect the present invention relates to an improved method of recovering phosphorous from an aqueous solution comprising the steps of providing the aqueous solution comprising soluble phosphorous, adding a composition, the composition comprising 5-40% CaO (w/w, relative to a total weight of the composition), 10-40% clay mineral, and 20-60% $CaCO_3$, wherein 0.5-2 mole CaO/mole soluble P is added, and recovering the phosphorous.

In an example of the present method the solution is an acidic solution, the acid aqueous solution having a pH of 1-6, wherein the pH is increased to 5.5-8 by adding the composition. In a further example the solution is a basic solution. Hence, with the present method in principle any pH range of the aqueous solution can be handled; it is noted that many waste streams are (slightly) acidic in nature.

In an example of the present method an amount of soluble phosphorous present is in a range of 1-50 ppm (mg/l). In a further example an amount of soluble phosphorous present is in a range of 100-1000 ppm (mg/l). In a further example an amount of soluble phosphorous present is in a range of 10-250 g/l. Surprisingly the present method is capable of reducing losses in (very) low soluble P concentration solutions to less than 20% and typically less than 10%; hence it is still worthwhile to strip such solutions from small amounts of phosphorous being present therein. Also the present method is capable of reducing losses in (very) high soluble P concentration solutions to less than 1%; such is in view of the prior art a major step forward. In an example the present method may be performed more than once, especially for relatively high concentration solutions, e.g., first recovering almost all of the phosphorous, and then recovering a majority of what is left in the first step. As such losses can be reduced to less than 0.2%.

In an example of the present method the clay mineral is selected from a natural or artificial clay, the clay preferably being a monovalent cation clay, comprising one or more of $H+$, $Na+$, $K+$, $Li+$, such as a TOT-clay (or 2:1 clay) or T-O clay (1:1 clay), such as a kaolin clay, such as kaolinite, dickite, halloysite and nacrite, a smectite clay, such as bentonite, montmorillonite, nontronite and saponite, an illite clay, a chlorite clay, a silicate mineral, such as mica, such as biotite, lepidolite, muscovite, phlogopite, zinnwaldite, clintonite, and allophane. In this respect the best results have been found with smectite, montmorillonite, kaolinite and kaolin, and especially with kaolin. Good results have been obtained with relatively small amounts of clay. It is noted that when leaving out the clay from the present composition makes the present method (much) less robust and losses of phosphorous (remaining in the aqueous solution) increase. The clay is therefore considered an essential element of the present composition.

Kaolinite is a clay mineral, part of the group of industrial minerals, with the chemical composition $Al_2Si_2O_5(OH)_4$. From kaolinite endothermic dehydroxylation (or alternatively, dehydration) beginning at 550-600° C. produces disordered meta-kaolin, $Al_2Si_2O_7$. Meta-kaolin is not a simple mixture of amorphous silica ($SiO_2$) and alumina ($Al_2O_3$), but rather a complex amorphous structure that retains some longer-range order (but not strictly crystalline) due to stacking of its hexagonal layers. A large use is in the production of paper, including ensuring the gloss on some grades of paper. Commercial grades of kaolin are supplied and transported as dry powder, semi-dry noodle or as liquid slurry. Thus, kaolin and meta-kaolin are considered as silica-alumina compounds also forming part of a sorbent obtained from paper-waste or the like.

The clay preferably has a cationic exchange capacity of 2-200 meq/100 grams clay at a pH of 7, more preferably 5-150 meq/100 grams, even more preferably 10-120 meq/100 grams. It has been found that clays having a relatively higher CEC perform better in terms of relevant characteristics for the present invention.

In an example of the present method the composition comprises 10-35% CaO (w/w), preferably 20-30% CaO (w/w), such as from 25-28% (w/w), 15-35% (w/w) (meta) kaolin, that may or may not be in the dehydrated form of meta-kaolin, preferably from 20-30% (w/w), such as from 25-27% (meta)kaolin (w/w), and 25-50% $CaCO_3$ (w/w), preferably 30-45% (w/w), such as from 35-40% (w/w). It has been found that with the above example very good results were obtained, e.g., in terms of losses of phosphorous.

In an example of the present method 0.8-1.2 mole CaO/mole soluble P is added. Such may be considered as a minimal amount to recover the phosphorous. So with minimal costs for reactants losses of phosphorous are reduced significantly.

In an example of the present method the composition is obtained by thermal conversion of a material chosen from paper waste and residue from the paper production, such as TopCrete™. This latter composition performs exceptionally well, e.g., gives higher yields, can be recycled as such by use in the present method, and above all is cheap. This is at least surprising, as this composition relates to a waste product, which waste products performs even better than virgin materials. Note that from an economical point of view mixing the ingredients of the present composition is not feasible.

Below some details of a preferred example of the present composition are given. Further details on how the manufacture the present composition can be found e.g. in Dutch Patent Application NL9401366, filed 24 Jun. 1994, and subsequent International Application WO1996/006057. Therein a method is described for the incineration under precisely defined conditions, of a kaolin-containing material, such as waste paper and other residues stemming from recycling of waste paper, optionally for reuse in the paper industry, yielding a material of puzzolanic properties. The kaolin-containing material is thermally treated in a fluidized bed installation having a freeboard in the presence of oxygenous gas. Therein the fluidized bed is operated at a temperature between 720 and 850° C. and the temperature of the freeboard is 850° C. or below 850° C. and that the fluidized bed is preferably provided with means to promote heat transfer. By accurately controlling the temperature in the fluidized bed and the freeboard a puzzolanic material is obtained containing metakaolinite and calcium oxide converted into calcium hydroxide. Careful control of the process conditions avoids that the produced metakaolinite is converted into a material of poorer puzzolanic properties. Further, the puzzolanic material obtained only contains a limited amount of calcium oxide, which oxide, in contrast with the hydroxide, has adverse effects on the strength of the concrete and hardened cement manufactured with puzzolanic material. Due to the presence of water that is released during incineration, that is present in the starting material and that optionally is added, it is possible to obtain in one single plant, the fluidized bed installation, a puzzolanic material which is suitable as cement or one of its components. In this way this method saves on a further installation for the conversion of calcium oxide into calcium hydroxide, which, from an economic point of view, is favorable. As mentioned, the kaolin-containing material used is preferably waste paper or residues that stem from recycling of waste paper for reuse in the paper industry. Said residues, which may serve as starting material in the described method, may be inferior paper residue, that is to say paper residue having on average too short a fiber length or sludge from waste water purification plants of the paper industry using waste paper as basic material. In this way a residue is utilized for the manufacture of a high-grade puzzolanic material. This material is commercially known as TopCrete™. The above method is considered to be the only economically viable method to obtain the high grade puzzolanic material. It is noted that due to the origin of the material, the material being in essence a waste material, the composition may vary, typically over the ranges claimed. Despite this naturally occurring variation the results in terms of recovering phosphorous vary only marginally; a relatively constant recovery is observed. This material has surprisingly been found to function with superior results within the present method.

According to a preferred embodiment the above method is characterized in that the temperature of the fluidized bed is 780° C. To this end the incineration takes place in a fluidized bed at a temperature of preferably 780° C. wherein the same or a lower temperature prevails in the freeboard. The teachings of these documents are referred to for better understanding.

TABLE 1

Characteristics of a present composition
CHEMICAL COMPOSITION (wt. % relative to total mass)

| Batch | 1 | 2 | 3 |
|---|---|---|---|
| CaO | 57.2 | 56.2 | 58.3 |
| $SiO_2$ | 22.1 | 23.3 | 19.5 |
| $Al_2O_3$ | 15.2 | 15.8 | 18.7 |
| $MgO_2$ | 1.9 | 1.3 | 1.1 |
| $Fe_2O_3$ | 0.7 | 0.7 | 0.7 |
| $SO_3$ | 0.3 | 0.1 | 0.1 |
| $K_2O$ | 0.2 | 0.1 | 0.1 |
| $Na_2O$ | 0.2 | 0.2 | 0.2 |
| $P_2O_5$ | 0.1 | 0.1 | 0.1 |
| CuO | 0.1 | 0.1 | 0.1 |
| $ZrO_2$ | 0.05 | 0.01 | 0.02 |
| SrO | 0.02 | <0.1 | <0.1 |
| ZnO | <1 | <2 | <3 |
| BaO | <0.1 | <0.1 | <0.1 |
| Cl | <0.1 | <0.1 | <0.1 |
| MnO | <0.1 | <0.1 | <0.1 |
| NiO | <0.1 | <0.1 | <0.1 |
| Total | 98.07 | 97.91 | 98.92 |

It is noted that the above composition obtained by thermal conversion may vary to some extent over time, and may vary form paper plant to paper plant. However, it has been found that such variation, if controlled, is compatible with the present invention, as is, e.g., detailed in the present claims.

In an example of the present method the aqueous solution is selected from waste water, treated waste water, sludge, organic acid digest solution, acid digest solution, animal manure, such as pig manure, cow manure, chicken litter, and combinations thereof. Hence the present process is robust and capable of handling various waste streams and yielding good results. From a circular economy point of view especially treatment of animal manure, recovering the phosphorous, adding the phosphorous as a fertilizer to crops, and feeding crops to animals, is a very interesting opportunity.

In an example of the present method the aqueous solution comprises 0.01-6 wt. % solids. As such also (slightly) polluted waste streams can still be treated, albeit typically at the consequence of having a part of the solids of the solution in the recovered product. Such may not be a concern, however.

In an example the aqueous solution may be treated further. For instance, an organic acid digest may be treated for phosphorus recovery before it is added to a thermophilic or mesophilic digester. Such treatment may relate to additional screening, floatation, sedimentation, filtration, or centrifugation of large particles in the digest before phosphate removal from the remaining liquid portion. A resulting calcium phosphate product may be collected by sedimentation (either static sedimentation in a settling tank or sedimentation in an upwelling flow as in a fluidized bed reactor), filtration, or centrifugation. The processed organic digest may be sent to the thermophilic digester for methanogenesis. Also an organic acid digest either with or without particle removal, may be applied to an ion exchange column loaded with, e.g., the present composition. Operation will be much like that of standard ion-exchange columns used for water softening. After the column is spent, resulting calcium phosphate particles in the column may be removed by backwashing with tap water or plant effluent. The column can be regenerated. Further, an organic acid digest is treated for phosphorus recovery and returned to the organic acid digester. As in the first and second embodiments, additional screening, floatation, sedimentation, filtration, or centrifugation of large particles in the digest is permitted before phosphate removal from the remaining liquid portion. Phosphate recovery will be effected by either reaction with the present composition.

In an example of the present method the aqueous solution comprises impurities, such as heavy metals, organic matter, and humus; despite these impurities still good results are obtained. Hence the present method is robust.

In an example the present method is for forming brushite ($CaHPO_4.2H_2O$), wherein the brushite precipitates, and wherein the precipitate is recovered and optionally dried. As indicated above, brushite is a preferred phosphate mineral for agricultural applications. With the present method 50-90% of the phosphate is recovered as brushite. It is considered that this percentage can be optimized further. Such is compared to several prior art methods also an advantage, as often the mineral struvite is obtained.

In an example of the present method, for an acidic aqueous solution, the pH is increased to 6-7, preferably to 6.2-6.7. In fact, there is no need to add further reactant to this end; typically the CaO is sufficient to establish such an increase, even if the pH of the solution is relatively low. So also in this respect the present method is robust.

In an example of the present method the composition comprising CaO, the clay mineral, and $CaCO_3$ is homogeneously distributed. That is particle sizes and composition per unit volume or unit surface varies over a narrow distribution. Such a composition provides the present results.

In an example of the present method, it is preferred that the present composition, such as TopCrete™, has a relatively large surface according to the Brunauer-Emmett-Teller (BET) method of 5-100 $m^2/gr$, such as 10-30 $m^2/gr$. In this aspect addition of such a material with such a high BET-surface is considered advantageous as described throughout the application. The present composition preferably has a particle size distribution (laser granulometric, ISO13320 (2009), e.g. Malvern, Mastersizer 3000) of 90% smaller than 50 μm, 80% smaller than 30 μm, 50% smaller than 10 μm, and 30% smaller than 3 μm.

In a second aspect the present invention relates to a product obtained by the present method, comprising (on an atom/atom basis) 40-70% brushite)($CaHPO_4.2H_2O$, preferably 45-65%, such as 50-55%, 10-30% calcite ($CaCO_3$), preferably 12-25%, such as 15-20%, 1-10% meta-kaoline ($Al_2Si_2O_7$), preferably 2-8%, such as 3-7%, 0.1-20% Mg phosphate)($MgHPO_4.2H_2O$, preferably 0.2-15%, such as 0.5-10%, and preferably <1000 ppm (mg/kg) heavy metals (As, Cd, Cr, Co, Cu, Pb, Hg, Mb, Ni, Se, and Zn), e.g. as indicated below. Advantages of the present product are detailed above. It may be noted that further constituents of the present product, such as clay and $CaCO_3$, do not interfere negatively when e.g. the product is used as fertilizer. For many purposes addition of these constituents is in fact beneficial, such as in terms of maintaining water in the soil.

In a third aspect the present invention relates to a use of the present product as a fertilizer. This has been found to give advantages over the prior art products. In view of availability to plants it is preferred that a fertilizer is readily available, hence being well soluble, whereas in view of leaching the product is hardly soluble; the present product is found to be readily available to plants and not to leach, which came as a surprise. Possibly this is a consequence of the way the product is made, i.e., the present method, which may be slightly acidic. Leaching is found to be more prone for phosphate compositions that were made using a method at a pH from 8-10.

In view of availability of a fertilizer, i.c. brushite, reference can be made to, e.g., the Penn State Agronomy Guide 2015-2016, which is also available on-line. It mentions that "The solubility of phosphorus in fertilizer varies. The legal definition of available phosphorus in fertilizer is the sum of the phosphorus that is soluble in water plus that which is soluble in a citrate solution." It is noted that the present phosphate is present as a precipitate. The water soluble part, prone to leaching, of the present phosphate is relatively small, whereas the in citrate solution available part, prone to uptake by plants, is relatively high; both are taken relatively to existing phosphate minerals used for similar purposes.

It is a further advantage that the further components, e.g., $CaCaO_3$ and clay are not toxic and contribute especially in cases of acid soils to the soil quality and availability to plants of the fertilizer. Due to presence of these further components a relative percentage of phosphorous is lower compared to, e.g., use of $Ca(OH)_2$.

In addition to clay and calcite also some Mg phosphate, most likely $MgHPO_4.2H_2O$, is typically formed, due to presence of some Mg in the present composition.

Despite that in case of use of municipal waste water as a phosphate source contaminants may/are present in the waste water, these contaminants are not found in the present phosphate precipitate, or at least well below government regulations and norms; in other words, at the most at a ppm level, and typically below 1 ppm. For instance As 0.5-2.0 ppm, Cd<0.5 ppm, Cr not tested, Co 0.5-2 ppm, Cu 50-350 ppm, Pb 1-80 ppm, Hg<0.05 ppm, Mb 0.5-1.5 ppm, Ni 1-10 ppm, Se<10 ppm, and Zn 20-200 ppm (on a weight/weight basis, relative to a total mass of the precipitate). For already heavily polluted waste streams, e.g., of process industry, comprising high amounts of contaminants such as heavy metals, the waste stream most likely needs to be cleaned from contaminants first; thereafter the present method could be still applicable.

SUMMARY OF FIGURE

FIG. 1. Experimental configuration of a brushite recovery process.

DETAILED DESCRIPTION OF THE FIGURE

FIG. 1 is further detailed, in as far as relevant, below.

EXPERIMENTS

The below relates to experiments performed on a specific type of waste stream. Organic acid digest is a product of an initial step of a multi-phase, multi-temperature anaerobic digestion process used at some wastewater treatment plants, often with the intention of reducing solids loading and increasing biogas generation. Within the 1 to 4-day retention time, acidogenesis and acetogenesis occur, resulting in a digest containing high concentrations of volatile fatty acids, an acid pH, and high concentrations of soluble phosphorus.

Methodology

TopCrete™ was tested in the second of five batch brushite recovery trials at Madison Metropolitan Sewerage District (MMSD). Organic acid digest was produced in a custom-built 208-L digester with a 50/50 (v/v) mixture of primary sludge and activated sludge. The sludge was held for ten days at a four-day residence time until the pH stabilized. The digest having a pH of 5.46, a temperature of 37° C., and 4.38 wt. % solids, was then mixed with a flocculent and pumped through a decanter centrifuge (Table 1). See FIG. 1 for process configuration.

A first experiment relates to laboratory jar tests: such provides an initial assessment of how TopCrete™ could perform on a larger scale. Organic acid centrate was collected in triplicate 1-L jars and sufficient TopCrete™ was added to raise the pH to 6.5. Initial and final samples of the centrate were analyzed by ICP.

As a second experiment, in a scaled up version, a batch trial was performed: The above centrate was collected in a 190-L mixing tank, after which 312.5 g of TopCrete™ was added in a 250 g/l slurry, bringing the pH of the digest to 6.5. The precipitate was settled, collected, and dried in an oven at 50° C. Initial and final samples of the centrate were analyzed by ICP. The settled material was collected and analyzed by ICP and XRD. Citrate-soluble P (which corresponds to available P) and heavy metals were measured as well. All samples were collected and measured in triplicate.

Results and Discussion

The centrate used for the jar tests initially contained 731 ppm (mg/l) of soluble phosphorus with 0.40% solids (Table 3 and Table 4). Addition of TopCrete™ to the centrate reduced the soluble phosphorus to a final 215 ppm, a 71% reduction. The TopCrete™ and brushite settled out of solution easily. For an initial test such a reduction is considered promising. Chemical analysis indicated 11.3% P in the recovered precipitate of the jar test, equivalent to 25.9% $P_2O_5$ (Table 5) if expressed in oxide format.

Centrate for the batch trial initially contained 715 ppm phosphorus with 0.46% solids (Table 3 and Table 4). TopCrete™ successfully precipitated brushite and settled as easy as in the jar tests. Centrate phosphate was reduced from an initial value of 715 ppm P to 2 (sic!) ppm, a 99% reduction in the soluble phosphorus (Table 4). The phosphorus content of the precipitate was 8.8% P, or 20.2% $P_2O_5$ (Table 5) if expressed in oxide format.

Conclusion

TopCrete™ performed well in reducing soluble P in the organic acid digests, with a 71% reduction in soluble phosphorus during the jar test and a 99% reduction in the batch trial. The resulting material settled well and had a P content of 11.3 and 8.8% in the jar and batch tests, respectively. It is noted that pure brushite, $CaHPO_4.H_2O$, has a P content of 18%, indicating some "dilution" of brushite with the adjunct minerals in TopCrete™ that carried through to the precipitate. These results indicate very promising potential use of TopCrete™ as a source material for a phosphorus recovery and upcycling process.

TABLE 1

Organic acid digest composition for Trial 2.

| Trial | Date | Composition | pH | Temp ° C. | % Solids |
|---|---|---|---|---|---|
| Jar test | 21 Oct. 2013 | Primary/WAS | 5.48 | 36.5 | 4.05 |
| Batch | 23 Oct. 2013 | Primary/WAS | 5.46 | 37.0 | 4.38 |

TABLE 2

Phosphorus in acid digest pre-centrifugation (mg kg−1).

| Trial | Soluble | Total P | Soluble |
|---|---|---|---|
| Jar test | 969 | 1166 | 83% |
| Batch | 1118 | 1298 | 86% |

TABLE 3

Solids in cake and centrate.

| Trial | Cake | Centrate |
|---|---|---|
| Jar test | — | 0.40% |
| Batch trial | 20% | 0.46% |

TABLE 4

Phosphorus in centrate pre and post precipitation (mg kg−1).

| Trial | Soluble P Centrate Pre Precipitation | Soluble P Centrate Post Precipitation | P Reduction in Centrate |
|---|---|---|---|
| Jar test | 731 | 215 | 71% |
| Batch | 715 | 2 | 99% |

Comparable tests using $Ca(OH)_2$ show a reduction in phosphorous of 81%, 86%, 89% and 61% respectively, hence between 10-38% lower (based on 100% recovery possible).

TABLE 5

Percent of phosphorus in recovered precipitate.

| Sample | Total Phosphate ($P_2O_5$) |
|---|---|
| Jar test precipitate | 25.9% |
| Batch trial precipitate | 20.2% |

Comparative data

| | P-reduction | Method | pH | Remarks |
|---|---|---|---|---|
| EP' 243[1] | 35-90% | Stirred reactor | >8 | 3 |
| Berg[2] | 30-95% | fixed bed/ expanded bed | ? | 4 |
| Present | >99% | Mixing & precipitating | 6.5 | 5 |

[1]FIGS. 2 and 3.
[2]FIGS. 2-5.
[3]Highest efficiency @ smallest volume, due to extreme high dosage.
[4]Highest efficiency with new bed; gradual decrease thereafter.
[5]performs well at acidic and almost neutral conditions, contrary to prior art methods relying on precipitation at a higher pH. Such is considered beneficial to a final product (in terms of e.g. yield and availability), to the product formed (at present mainly brushite), and for reaction conditions being relatively mild.

TABLE 6

Percent of phosphorus in recovered precipitate and percent available.

| Sample | Citrate-soluble $P_2O_5$ | Total Phosphate ($P_2O_5$) | Percent "Available" |
|---|---|---|---|
| Jar test precipitate | — | 25.9% | — |
| Batch Trials | | | |
| Trial 1 | — | — | — |
| Trial 2 (CDEM) | 17.0% | 20.2% | 84% |
| Trial 3 | 30.7% | 35.3% | 87% |
| Trial 4 | 21.6% | 32.0% | 68% |
| Trial 5 | 32.2% | 38.1% | 84% |

Trials 1 and 3-5 relate to a $Ca(OH)_2$ composition, whereas trial 2 relates to use of Toperete (a composition according to claim 1), giving besides the highest recovery (99%) also almost the highest availability.

Application of the present fertilizer, comprising 48.9 atom % brushite, 22.5 atom % calcite, 6.2 atom % meta-kaolinite, and 11.6 atom % Mg phosphate, to crops showed improved yields. For instance, addition of 25-100 ppm (or mg/kg soil) showed an increase in dry yield (g/pot) of 6-10% relative; hence a beneficial effect is shown as well as the availability to plants of the present fertilizer. These results are comparable to improvements obtained with other typically used phosphate sources, of which some showed slightly higher improvements under similar conditions; however, as the present precipitate is effectively diluted, such as by a factor 2, in fact better results are obtained.

The invention is elucidated through the examples and figures which are exemplary and explanatory of nature and are not intended to be considered limiting of the invention. To the person skilled in the art it may be clear that many variants, being obvious or not, and combinations of the examples and embodiments, may be conceivable falling within the scope of protection, defined by the present claims.

What is claimed is:

1. An improved (semi)continuous method of recovering phosphorous from an aqueous solution comprising the steps of:
   providing the aqueous solution comprising soluble phosphorous, adding a composition, the composition comprising as mixed ingredients
   5-40% CaO (w/w, relative to a total weight of the composition),
   10-40% clay mineral, and
   25-60% $CaCO_3$,
   wherein 0.5-2 mole CaO/mole soluble P is added, and
   recovering the phosphorous, by forming a product comprising brushite ($CaHPO_4.2H_2O$), calcite ($CaCO_3$), and meta-kaoline ($Al_2Si_2O_7$),
   wherein the composition is not a calcium silicate hydrate (CSH).

2. The method according to claim 1, wherein the solution is an acidic solution, the acidic aqueous solution having a pH of 1-6, wherein the pH is increased to 5.5-8 by adding the composition.

3. The method according to claim 1, wherein the solution is a basic solution.

4. The method according to claim 1, wherein an amount of soluble phosphorous present is in a range of 1-50 ppm (mg/l).

5. The method according to claim 1, wherein an amount of soluble phosphorous present is in a range of 100-1000 ppm (mg/l).

6. The method according to claim 1, wherein an amount of soluble phosphorous present is in a range of 10-250 g/l.

7. The method according to claim 1, wherein the clay mineral is selected from a natural or artificial clay.

8. The method according to claim 1, wherein the composition comprises
   20-30% CaO (w/w),
   20-35% (meta)kaolin, and
   25-50% $CaCO_3$ (w/w), and
   wherein 0.8-1.2 mole CaO/mole soluble P is added.

9. The method according to claim 1, wherein the composition is obtained by thermal conversion of a material chosen from paper waste and residue from the paper production.

10. The method according to claim 1, wherein the aqueous solution is selected from the group consisting of waste water, treated waste water, sludge, organic acid digest solution, acid digest solution, animal manure, pig manure, cow manure, and combinations thereof.

11. The method according to claim 1, wherein the aqueous solution comprises 0.01-6 wt. % solids and impurities.

12. The method according to claim 1, wherein in the composition comprising CaO, the clay mineral, and $CaCO_3$ are homogeneously distributed.

13. The method according to claim 1, wherein the composition has a BET surface area of 5-100 $m^2/gr$.

14. The method according to claim 1, wherein the product precipitates, and wherein the precipitate is recovered.

* * * * *